United States Patent [19]
Dietrick et al.

[11] 4,450,341
[45] May 22, 1984

[54] CONTACT TIP FOR A WELDING HEAD
[75] Inventors: Earl T. Dietrick, Euclid; Timothy F. Prayner, Mentor, both of Ohio
[73] Assignee: Townmotor Corporation, Mentor, Ohio
[21] Appl. No.: 340,585
[22] Filed: Nov. 30, 1981
[51] Int. Cl.³ .............................................. B23K 9/00
[52] U.S. Cl. ................................ 219/137.52; 219/136
[58] Field of Search ........................... 219/136, 137.52
[56] References Cited
U.S. PATENT DOCUMENTS
1,959,180   5/1934   Stephens ........................... 219/136
3,470,349   9/1969   Sievers ............................. 219/136

Primary Examiner—B. A. Reynolds
Assistant Examiner—Alfred S. Keve
Attorney, Agent, or Firm—Robert A. McFall

[57] ABSTRACT

A contact tip (10) for a welding head (12) includes a wear-resistant member (34) and a transverse passageway (32). Wear-inducing deposits on the surface of consumable electrodes result in shortened service life of contact tips. In the contact tip (10) of the present invention, surface contaminants are removed from electrode (28) by a hard, wear-resistant member (34) and directed radially outwardly to an external surface (16) through a transverse passageway (32). The present invention is particularly useful in high duty-cycle automatic or robot-controlled welding operations.

6 Claims, 3 Drawing Figures

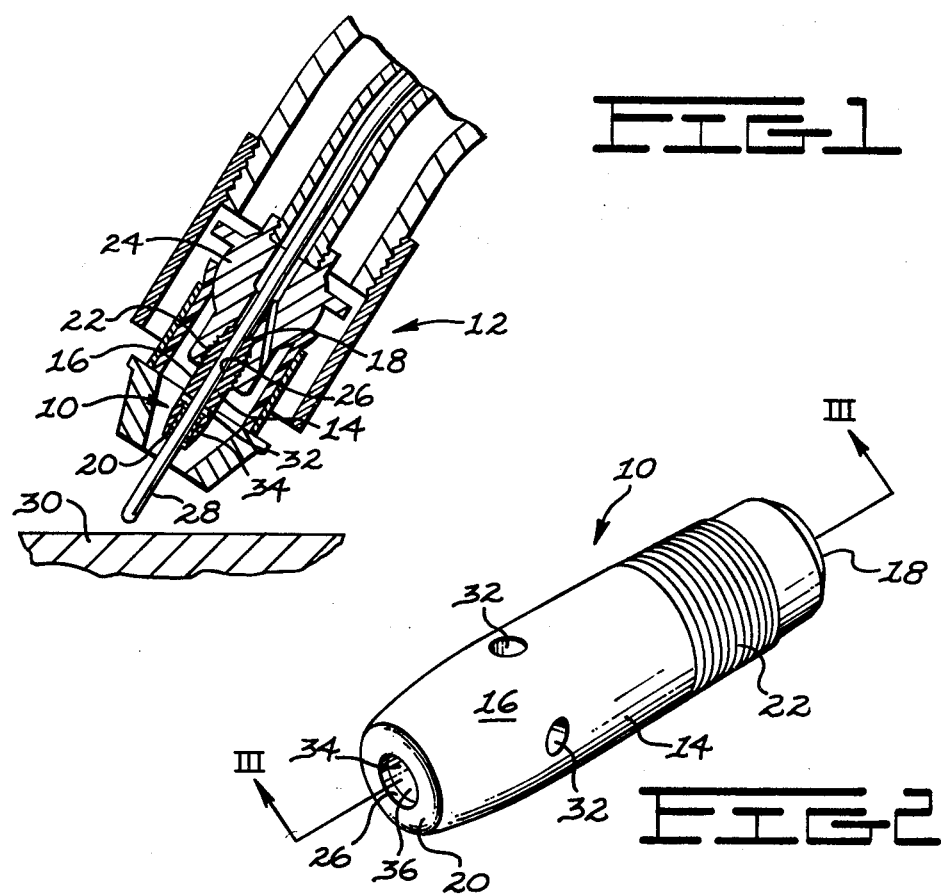
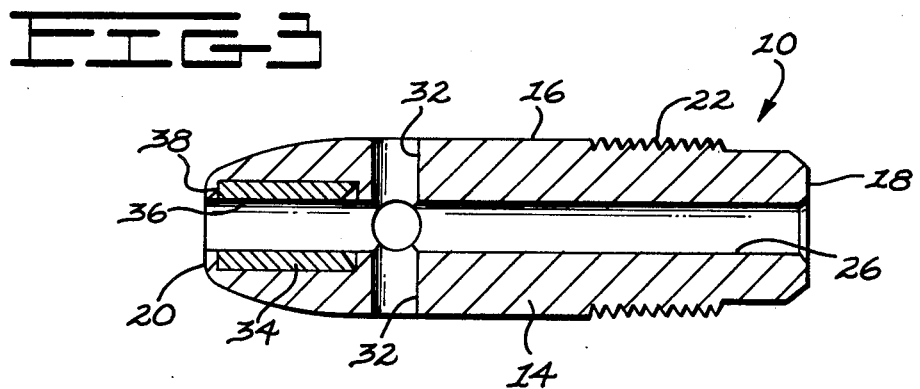

CONTACT TIP FOR A WELDING HEAD

DESCRIPTION

1. Technical Field

This invention relates generally to a contact tip for a welding head and more particularly to a contact tip having a wear-resistant insert and a transverse passageway for the removal of wear-inducing matter.

2. Background Art

The contact tip of a welding head used in conjunction with consumable electrodes generally provides the dual functions of conducting electrical current to the electrode and guiding the electrode to the workpiece. As a result of desirable electrical conductivity characteristics, copper has been universally designated as the preferred material for contact tips. Copper, however, is a relatively soft metal and the internal passageway of the contact tip is easily abraded by contact with an electrode. Consumable electrodes, usually in continuous wire form, are typically treated by the manufacturer, with a protective coating to prevent oxidation and deterioration of the electrode during shipping and storage. Additionally, the surface of the electrode wire may become contaminated with dust or other deleterious matter during shipping and storage. Further contaminates on the electrode surface add to the internal passageway wear problem of contact tips. A passageway enlarged by wear reduces the effectiveness of the contact tip in guiding the electrode and in transferring electrical current to the electrode.

In manual welding operations, a welder is able to physically compensate for electrode displacement and a limited amount of tip wear can be accommodated. However, in automatic or robot-controlled welding operations, the position of the welding head is predetermined and the workpiece-contacting end of the electrode must remain in a fixed, spaced relationship with the welding head.

One attempt to solve the contact tip wear problem is taught in U.S. Pat. No. 2,289.938, issued July 14, 1942 to W. E. Smith. The Smith patent shows a hardened steel, wear-resistant insert placed within the contact tip assembly. However, it has been found that the protective coating applied to the electrodes during manufacture is removed from the electrode surface by hard wear-resistant materials and becomes compacted in the tip passageway, prohibiting uniform feeding of the electrode to the workpiece.

The present invention is directed to overcoming one or more of the problems as set forth above. In particular, the present invention provides a long wearing contact tip having a means for inhibiting the build-up of compacted material in the internal passageway of the tip.

DISCLOSURE OF THE INVENTION

In accordance with one aspect of the present invention, a contact tip for a welding head includes a body having a wear-resistant insert and longitudinal and transverse passageways. The transverse passageway communicates with longitudinal passageway with an outer surface of the body.

The useful life of welding contact tips in current use is severely limited due to wear resulting from the passage of consumable electrodes through the internal passageway of the contact tip. Internal wear reduces the ability of the contact tip to accurately guide the electrode to a workpiece. Additionally, excessive internal wear of the tip inhibits the continuous uniform transfer of electric current to the electrode. Previous attempts to solve the internal wear problem by the use of harder, less wear-sensitive materials has resulted in the trapping of electrode coatings and other material dislodged from the electrode surface. The trapped material quickly compacts and clogs the electrode passageway necessitating a waste of time in cleaning or discarding of the contact tip.

The present invention solves the above problems by providing a contact tip that is both self-cleaning and resistant to wear. The contact tip of the present invention has a wear-resistant insert to guide the electrodes and a transverse passageway to alleviate the build up of deleterious material within the internal longitudinal passageway of the contact tip.

BRIEF DESCRIPTION OF THE DRAWING

FIG. 1 is a sectional view of a welding head having a contact tip representing an embodiment of the present invention.

FIG. 2 is a three-dimensional view of an embodiment of the present invention.

FIG. 3 is a section view of the embodiment of the present invention taken along the lines III—III of FIG. 2.

BEST MODE FOR CARRYING OUT THE INVENTION

In the preferred embodiment of the invention, a contact tip 10 is shown in FIG. 1 in conjunction with a conventional welding torch or head 12. The contact tip 10, as shown in greater detail in FIGS. 2 and 3, includes a body 14 having a generally cylindrical external surface 16. The body 14 is formed of a first material, preferably copper, and includes an electrode receiving end 18 and an electrode discharge end 20 spaced from the receiving end 18. A plurality of screw threads 22 are formed on the external surface 16 near the receiving end 18. The screw threads 22 secure the contact tip 10 to the welding head 12 by engagement with mating threads formed in a tip holder assembly 24 of the welding head 12.

The body 14 also includes a centrally disposed longitudinal passageway 26 extending through the body 14 from the electrode receiving end 18 to the electrode discharge end 20.

As best shown in FIG. 1, the walls of the longitudinal passageway serve to physically contact and direct a continuous wire electrode 28 passing through the contact tip 10 to a workpiece 30.

The body 14 further includes at least one transverse passageway 32 communicating the longitudinal passageway 26 with the external surface 16. In the preferred embodiment, the longitudinal passageway 32 is formed by cross-drilling two intersecting holes through the body 14 at right angles with respect other, thereby forming four transverse passageways 32 extending between the longitudinal passageway 26 and the external surface 16.

The contact tip 10 further includes a wear-resistant member 34 having an inner passageway 36 aligned with the longitudinal passageway 26. The wear-resistant member 34 is positioned within the body 14 at a position substantially adjacent the electrode discharge end 20 of the body 14. The wear-resistant member 34 is formed of a different second material such as tool steel, metallic carbide alloys, or a ceramic composition. In the preferred embodiment, the wear-resistant member 34 is formed of air hardened tool steel, and the electrode discharge end 20 of the body 14 is peened over an end 38 of the wear-resistant member 34 to positively position the member 34 and protect the member 34 from weld spatter during operation.

Preferably the transverse passageway 32 is axially positioned between the wear-resistant member 34 and the electrode receiving end 18 of the body 14 and even more desirably is positioned immediately adjacent and end of the wear-resistant member 34. In the preferred embodiment, the transverse passageway 32 is axially spaced less than 0.25 in. (6.3 mm) from the wear-resistant member 34.

In one example, a contact tip 10 was constructed according to the present invention and used in conjunction with a consumable wire electrode having a nominal diameter of 0.094 in. (2.4 mm). The coaxially aligned longitudinal passageway 26 and the inner passageway 26 were equally sized to 0.102 in. (2.6 mm) dia. Four transverse passageways were formed to a diameter of 0.063 in. (1.6 mm) and were axially spaced 0.02 in. (0.5 mm) from the wear-resistant member 34.

INDUSTRIAL APPLICABILITY

The contact tip 10 of the present invention is particularly useful in a welding head adapted for automatic or high duty-cycle welding operations in which the tip wear problem is especially severe. In one example, the welding of a large fabricated assembly is carried out by a robot-controlled welding head feeding a 0.094 in. (2.4 mm) gas-shielded, flux-cored wire at a rate of 205 in./min. (86.8 mm/sec). Each assembly requires approximately 25 lbs (11 kg) of welding wire and a new contact tip of conventional construction is required after each 1.5 assemblies. It was found that in this particular operation, a conventional solid copper contact tip became worn and could not provide satisfactory directional control to the wire after feeding about 40 lbs. (18 kg) of the wire through the tip.

After changing the conventional contact tip on the weld head 12 of the robot-controlled welder to the contact tip 10 of the present invention, a total of 47 assemblies, consuming approximately 1200 lbs. (540 kg) of wire, were welded before the contact tip 10 became worn and required replacement. Thus, the contact tip 10 of the present invention demonstrated a thirty fold increase in wear life over a conventional contact tip.

Further, during operation of the weld head 12 having the contact tip 10 of the present invention, it was observed that the protective coating material on the electrode 28 was effectively stripped from the electrode surface by the hard, wear-resistant member 34 prior to passage of the electrode 28 through the inner passageway 36 of the wear-resistant member 34. The material removed from the electrode surface was then urged radially outwardly through the transverse passageways 32 to the external surface 16 and away from the longitudinal passageway 26. By providing a transverse passageway 32 for the removal of dirt, protective coatings and other wear-inducing matter from the surface of the electrode 28 prior to passage of the electrode 28 through the wear-resistant member 34, the service life of the wear-resistant member 34 was greatly increased. Further, removal of the surface materials from the longitudinal passageway effectively solved the internal clogging problem long experienced with contact tips constructed of relatively hard materials.

Other aspects, objects, and advantages of this invention can be obtained from a study of the drawings, the disclosure, and the appended claims.

We claim:

1. A contact tip for a welding head comprising:
a body formed of a first material and having an external surface, an electrode receiving end, an electrode discharge end, and a longitudinal passageway extending between said ends and having a construction sufficient for physically and electrically contacting a wire electrode of a predetermined diameter substantially along the entire length of said passageway and for directing the wire electrode while it passes through said longitudinal passageway;
as single wear-resistant member formed of a different second material and having a first end, a spaced second end, and an inner passageway extending between said first end and said second end, said passageway having a diameter substantially equal to the predetermined diameter of said electrode, said wear resistant member being mounted in said body with its first end disposed adjacent the electrode discharge end of said body, and the inner passageway of said member being aligned with the longitudinal passageway of said body; and
at least one transverse passageway in said body adjacent only the second end of said wear resistant member for communicating said longitudinal passageway with said external surface of the body.

2. The contact tip (10), as set forth in claim 1 wherein said electrode discharge end (20) of said body (14) covers an end (38) of said wear-resistant member (34).

3. The contact tip (10), as set forth in claim 1 wherein said transverse passageway (32) is axially spaced less than 0.25 inch (6.3 mm) from said wear-resistant member (34).

4. The contact tip (10) as set forth in claim 1 wherein said body (14) includes a plurality of transverse passageways (32) each communicating said longitudinal passageway (26) with said external surface (16).

5. The contact tip (10), as set forth in claim 1, wherein said first material forming said body (14) is copper.

6. The contact tip (10), as set forth in claim 1, wherein said second material forming said wear-resistant member (34) is selected from the group including steel, metallic carbide alloys, and ceramic compositions.

* * * * *